UNITED STATES PATENT OFFICE.

BENJAMIN A. VIENT, OF BUFFALO, NEW YORK, ASSIGNOR TO BELCO SANITARY MFG. CO., OF BUFFALO, NEW YORK, A CORPORATION OF NEW YORK.

ENAMELING COMPOSITION.

1,251,710.  Specification of Letters Patent.  Patented Jan. 1, 1918.

No Drawing.  Application filed January 3, 1916. Serial No. 69,771.

*To all whom it may concern:*

Be it known that I, BENJAMIN A. VIENT, a citizen of the United States, residing at Buffalo, in the county of Erie and State of New York, have invented new and useful Improvements in Enameling Compositions, of which the following is a specification.

The object of this invention is the production of a new composition for use as an enamel to cover articles, and an improved method of applying the same to articles, a novel method of making the same and an improved method of applying the same to articles.

Generally speaking this composition comprises celluloid, wood alcohol, gum camphor, ether, and amyl acetate. In preparing this composition three fourths of a pound of dry celluloid in suitable form is dissolved in three quarts of wood alcohol which preferably by a hydrometer test has a strength of 95%–97%. If desired the celluloid may be left standing still in this wood alcohol for about twelve hours to permit the celluloid to dissolve normally during which time the receptacle containing the same should be covered to prevent the wood alcohol from evaporating and losing strength. It is preferable, however, to stir this mixture to expedite the dissolution of the celluloid.

After the celluloid has been dissolved in the wood alcohol one quart of liquid solvent is added to the mixture which binder preferably contains 40 per cent. of ether, forty per cent. of wood alcohol and twenty per cent. of amyl acetate.

One ounce of gum camphor is also added to the above ingredients at any time and dissolved therewith.

After these ingredients have been thus assembled and mixed the liquid mass is strained to remove any lumps and then the same is thinned down if required by adding thereto a suitable quantity of equal parts of wood alcohol and the above described solvent.

This mixture is now applied to the article to be enameled either by spraying the enamel on the article or dipping the latter in the same. If desired only one coat of enamel need be applied to the article but the most satisfactory results are usually obtained by applying a plurality of coats on the article by repeated application of the liquid mixture thereon either by the dipping or spraying treatment referred to above.

After each treatment the freshly applied coat of liquid enamel is dried before another coat is applied thereto. This drying is preferably effected in normal atmosphere in about twenty minutes instead of by means of artificial heat because the latter is liable to produce a rough and blistered surface on the work.

When the desired number of coats of enamel have been applied to the article and dried thereon a lustrous or polished finish of the last coat may be obtained by subjecting the coated surface of the article to the action of a buffing, polishing wheel so that a high finish is imparted to the article.

By adding the particular binder to the dissolved celluloid the latter upon drying is drawn tightly and produces a glossy and close knit surface and also prevents the celluloid from becoming flaky or powdered which otherwise would cause the same to adhere imperfectly to the article and crack off easily. Furthermore, the addition of this gum camphor causes the celluloid when dry to stick firmly to the surface of the article and prevent the same from peeling off.

This enamel is very durable and elastic or flexible and prevents the surface of the article to which it is applied from being easily indented, marred or injured and therefore preserves said articles neat in appearance and capable of being easily kept in a clean condition.

It is to be noted that when a black or dark surface is to be covered with white or light enamel a greater number of coats are required than other color combinations. Moreover all surfaces must be free from oil, grease and acid in order to permit the enamel to adhere thereto. In the case of steel it is desirable to first electro-plate the same with copper before applying the enamel thereto, in order to cause the latter to stick better and also avoid discoloration due to rusting or corrosion of the steel surface if the latter were permitted to contact directly with the enamel.

I claim as my invention:

The herein described composition for enameling articles which is made by first taking three-fourths of a pound of dry celluloid, adding thereto three quarts of wood alcohol having a hydrometer test of 95 per cent. to 97 per cent. and stirring the same until the celluloid is completely dissolved, then adding one quart of solvent containing ether 40 per cent., wood alcohol 40 per cent. and amyl acetate 20 per cent., and then adding one ounce of gum camphor.

BENJAMIN A. VIENT.